United States Patent
Gehrig et al.

(10) Patent No.: US 10,144,671 B2
(45) Date of Patent: *Dec. 4, 2018

(54) PROCESS FOR HYDROPHOBIZATION OF CONCRETE

(71) Applicant: BASF SE, Ludwigshafen (DE)

(72) Inventors: Uwe Gehrig, Kirchweidach (DE); Alexander Assmann, Seeon (DE); Klaus Seip, Mutterstadt (DE); Martin Pichler, Kirchweidach (DE); Torben Gädt, Traunstein (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/519,865

(22) PCT Filed: Oct. 23, 2015

(86) PCT No.: PCT/EP2015/074618
§ 371 (c)(1),
(2) Date: Apr. 18, 2017

(87) PCT Pub. No.: WO2016/062866
PCT Pub. Date: Apr. 28, 2016

(65) Prior Publication Data
US 2017/0240468 A1    Aug. 24, 2017

(30) Foreign Application Priority Data
Oct. 23, 2014   (EP) .................................... 14190059

(51) Int. Cl.
*C04B 24/04*    (2006.01)
*C04B 24/00*    (2006.01)
(Continued)

(52) U.S. Cl.
CPC .......... *C04B 24/045* (2013.01); *C04B 24/008* (2013.01); *C04B 24/2652* (2013.01);
(Continued)

(58) Field of Classification Search
CPC ..... C04B 24/045; C04B 24/008; C04B 28/04; C04B 40/0039; C04B 41/46;
(Continued)

(56) References Cited

U.S. PATENT DOCUMENTS

| 355,710 A | 1/1887 | Perkins |
|---|---|---|
| 3,307,987 A | 3/1967 | Bieri |

(Continued)

FOREIGN PATENT DOCUMENTS

| AT | 391 131 B | 8/1990 |
|---|---|---|
| DE | 1 223 287 B | 8/1966 |

(Continued)

OTHER PUBLICATIONS

Machine translation of AT 391131 (Year: 1990).*

(Continued)

*Primary Examiner* — John E Uselding
(74) *Attorney, Agent, or Firm* — Curatolo Sidoti Co., LPA; Joseph G. Curatolo; Salvatore A. Sidoti

(57) ABSTRACT

A process for hydrophobization of concrete or mortar using an aqueous dispersion containing an alkylketene dimer, at least one emulsifier and a condensation product of phenol sulfonic acid and formaldehyde, naphthalene sulfonic acid and formaldehyde, or naphthalene sulfonic acid, phenol, formaldehyde and urea; and the concrete or mortar obtainable by the process. The process allows effective mass and surface hydrophobization of concrete.

15 Claims, 3 Drawing Sheets

(51) Int. Cl.

| | |
|---|---|
| *C04B 28/04* | (2006.01) |
| *C04B 40/00* | (2006.01) |
| *C04B 41/46* | (2006.01) |
| *C04B 41/00* | (2006.01) |
| *C04B 41/62* | (2006.01) |
| *C04B 24/26* | (2006.01) |
| *C04B 24/30* | (2006.01) |
| *C04B 24/38* | (2006.01) |
| *C04B 28/02* | (2006.01) |
| *C04B 111/10* | (2006.01) |
| *C04B 111/27* | (2006.01) |
| *C04B 103/40* | (2006.01) |
| *C04B 103/65* | (2006.01) |

(52) U.S. Cl.
CPC .............. *C04B 24/30* (2013.01); *C04B 24/38* (2013.01); *C04B 28/02* (2013.01); *C04B 28/04* (2013.01); *C04B 40/0039* (2013.01); *C04B 41/009* (2013.01); *C04B 41/46* (2013.01); *C04B 41/62* (2013.01); *C04B 2103/40* (2013.01); *C04B 2103/65* (2013.01); *C04B 2111/1006* (2013.01); *C04B 2111/1012* (2013.01); *C04B 2111/27* (2013.01)

(58) Field of Classification Search
CPC ... C04B 41/009; C04B 41/62; C04B 24/2652; C08B 24/2652
See application file for complete search history.

(56) References Cited

U.S. PATENT DOCUMENTS

| | | | |
|---|---|---|---|
| 3,935,021 | A | 1/1976 | Greve et al. |
| 4,470,877 | A | 9/1984 | Johnstone et al. |
| 4,767,457 | A | 8/1988 | Ley et al. |
| 5,437,722 | A | 8/1995 | Borenstein et al. |
| 5,814,411 | A | 9/1998 | Merrifield et al. |
| 5,817,249 | A * | 10/1998 | Audenaert .............. C03C 17/32 252/8.61 |
| 5,888,290 | A * | 3/1999 | Engle .................... B82Y 30/00 106/287.12 |
| 6,001,166 | A | 12/1999 | Ettl et al. |
| 6,159,339 | A | 12/2000 | Hassler et al. |
| 6,165,259 | A | 12/2000 | Hallstrom et al. |
| 6,414,055 | B1 | 7/2002 | Lauzon |
| 7,078,569 | B2 | 7/2006 | Ettl et al. |
| 8,097,124 | B2 | 1/2012 | Hamers et al. |
| 2002/0096294 | A1 | 7/2002 | Nicholass et al. |
| 2005/0107639 | A1 | 5/2005 | Ettl et al. |
| 2005/0250858 | A1 | 11/2005 | Wantling et al. |
| 2006/0283356 | A1 | 12/2006 | Donlon et al. |
| 2009/0139677 | A1 | 6/2009 | Hamers et al. |
| 2010/0116406 | A1 | 5/2010 | Mahoney et al. |
| 2014/0202647 | A1 * | 7/2014 | Hagiopol ............... D21H 21/16 162/164.6 |
| 2015/0119490 | A1 * | 4/2015 | Krishnan ................ C04B 24/36 523/122 |
| 2015/0368164 | A1 | 12/2015 | Gehrig et al. |

FOREIGN PATENT DOCUMENTS

| | | | | |
|---|---|---|---|---|
| EP | 0 223 105 | | 5/1987 | |
| EP | 0418015 A1 | | 3/1991 | |
| EP | 1 453 821 | | 1/2010 | |
| JP | 04-100994 | * | 2/1992 | ............ D21H 17/00 |
| JP | H05 305608 A | | 11/1993 | |
| JP | 2005 281051 A | | 10/2005 | |
| WO | WO 97/35068 | | 9/1997 | |
| WO | WO 00/63294 | | 7/1999 | |
| WO | WO 99/35103 | | 7/1999 | |
| WO | WO 01/81678 A2 | | 11/2001 | |
| WO | WO 02/28795 A2 | | 4/2002 | |
| WO | WO 2004/033581 A1 | | 4/2004 | |
| WO | WO 2004/108625 A1 | | 12/2004 | |
| WO | WO 2007/141197 A1 | | 12/2007 | |
| WO | WO 2010/053494 A1 | | 5/2010 | |
| WO | WO 2010/112197 A1 | | 10/2010 | |
| WO | WO 2014/174086 A1 | | 10/2014 | |

OTHER PUBLICATIONS

PCT/EP2015/074619—International Search Report, dated Jan. 12, 2016.
PCT/EP2015/074619—International Written Opinion, dated Jan. 12, 2016.
PCT/EP2015/074618—International Search Report, dated Jan. 21, 2016.
PCT/EP2015/074618—International Written Opinion, dated Jan. 21, 2016.
PCT/EP2015/074619—International Preliminary Report on Patentability, dated Apr. 25, 2017.
Negro, Carlos, et al., "Effects of Flocculants and Sizing Agents on Bending Strength of Fiber Cement Composites", Cement and Concrete Research, 2005, pp. 2104-2109, vol. 35.
Auweter, et al., "Fiber-Optical Quasi-Elastic Light Scattering of Concentrated Dispersions," Journal of Colloid and Interface Science, vol. 105, Issue 2, Jun. 1985, pp. 399-409.
Lilge, et al., "Diffusion in Concentrated Dispersions: A Study With Fiber-Optic Quasi-Elasted Light Scattering (FOQELS)," Colloid and Polymer Science, vol. 269, Issue 7, Jul. 1991, pp. 704-712.
Kuhn, Richard, "Houben-Weyl Methoden der Organischen Chemie," Makromolekulare Stoffe, vol. XIV/1, Nov. 1962, S. 411, pp. 420.
Wiese, et al., "Singe Mode Fiber in Fiber Optic Quasielastic Light Scattering: A Study of the Dyanimcs of Concentrated Latex Dispersions," The Journal of Chemical Physics, vol. 94, Issue 10, 1991, pp. 6429-6443.
Wiese, et al., "Single Mode Fibers in Fiber Optic Quasielastic Light Scattering: A Study of the Dynamics of Concentrated Latex Dispersions," The Journal of Chemical Physics, vol. 94, Issue 10, May 15, 1991, pp. 6429-6443.
Office Action in U.S. Appl. No. 15/519,891, dated Mar. 8, 2018.

* cited by examiner

PROCESS FOR HYDROPHOBIZATION OF CONCRETE

CROSS REFERENCE TO RELATED APPLICATIONS

This application is a national stage application of International Application No. PCT/EP2015/074618, filed 23 Oct. 2015, which claims priority from European Patent Application No. 14190059.7, filed 23 Oct. 2014, which applications are incorporated herein by reference.

The invention relates to a process for hydrophobization of concrete using an alkylketene dimer dispersion and to the concrete obtainable by the process of the invention.

Cement-based materials such as concrete, precast concrete parts and concrete ware, like pipes, wall segments and paving slabs, are frequently exposed to water which can penetrate into said materials since they are generally porous. Therefore, it is desirable to make the materials water-repellant in order to protect them from water. For this purpose hydrophobizing compositions are used, in particular fatty acid-based materials, waxes and organosilicones. However, the addition of relatively large amounts of fatty acid-based materials and waxes is required what may have a marked influence on the material properties of the hardened cement-based materials. The use of organosilicones bears the risk that they migrate to the surface of the materials so that the interior thereof is depleted of hydrophobizing agents.

EP 223 105 A2 (U.S. Pat. No. 4,767,457) discloses a method for rendering dispersion-based coating materials, synthetic resin-bonded renders and cement-containing and cement-free plasters water repellant by means of aqueous distearyldiketene emulsions. It is stated that metal soaps and distearyldiketene are difficult to incorporate into aqueous systems. To achieve incorporation a large amount of solvents such as mixtures of di-n-butyl esters of adipic, glutaric and succinic acid, 2,2,4-trimethylpentane-1,3-diol 1-isobutyrate, esters of $C_2$-$C_8$-carboxylic acids with $C_4$-$C_{25}$-alkanols, hydrocarbons, terpenes, natural oils and oligomeric polymers, are used together with alkylsulfates, alkylsulfonates and alkylethersulfates as emulsifiers. The use of such solvents is not acceptable in cement-based materials for concrete production for environmental reasons and due to a negative impact on the mechanical properties of concrete.

AT 391 131 B discloses a mixture for preparing molded articles comprising a hydraulic binder and cellulose fiber that were hydrophobized by surface-treatment with an alkyl ketene dimer. JP 2005281051 discloses a heat insulating material which is obtained by hardening a mixture comprising cement, a glassy volcanic material (Shirasu spheres), foamed polyurethane or expanded polystyrene and fibers, fabrics or a continuous fiber-reinforced resin material. The fibers, fabrics or the continuous fiber-reinforced resin material were hydrophobized by surface-treatment with an alkyl ketene dimer. Cement and Concrete Research 35 (2005) 2104-2109 discloses cellulose fibers for use in the manufacture of fiber cement. The fibers are hydrophobized by surface-treatment with an alkyl ketene dimer. JP H05 305608A discloses a peeling agent which reduces generation of bubbles on the surface of concrete. The peeling agent comprises a liquid water repellent substance an alkyl ketene dimer and a non-ionic surfactant.

The prior art does not provide a satisfying method for hydrophobizing cement. The problem underlying the present invention is, therefore, to provide a method for effectively hydrophobizing concrete or mortar. A further problem is to provide a method for effectively hydrophobizing concrete or mortar without significantly impairing the properties of the concrete such as workability.

Surprisingly, it has now been found that this problem is solved by a process for hydrophobization of concrete or mortar using an alkylketene dimer dispersion and without using an organic solvent.

The present invention therefore relates to a process for preparing hydrophobized concrete.

Embodiments of the invention are as follows:

1. A process for preparing hydrophobized concrete or mortar comprising the steps of
   (A) providing a cement slurry suitable for concrete or mortar preparation;
   (B1) adding an aqueous alkyl ketene dimer dispersion (AKD dispersion) comprising
   (a) an alkylketene dimer of the formula (I)

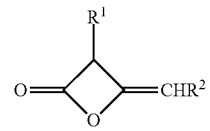

and/or of the formula (II)

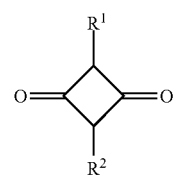

in which
$R^1$ and $R^2$ are identical or different hydrocarbon radicals comprising 10 to 24 carbon atoms;
(b) at least one emulsifier having a nitrogen content ≤1% by weight and the emulsifier being selected from the group consisting of a starch, cellulose, starch derivative or cellulose derivative;
(c) a condensation product of phenol sulfonic acid and formaldehyde, naphthalene sulfonic acid and formaldehyde or naphthalene sulfonic acid, phenol, formaldehyde and urea wherein the sulfonic acid groups may optionally be present in protonated or deprotonated or partly in protonated and partly in deprotonated form; wherein the dispersion has a charge density in the range from −5 to −150 µeq/g;
and allowing the cement slurry to harden;
or
(B2) allowing the cement slurry of step (A) to harden and applying said aqueous alkyl ketene dispersion to the surface of the hardened cement.

2. The method according to embodiment 1, wherein the hydrocarbon radicals in formula I or II are selected from branched and unbranched $C_{12}$-$C_{24}$-alkyl or $C_{12}$-$C_{24}$-alkenyl.

3. The method according to embodiment 1 or 2, wherein the hydrocarbon radicals are selected from branched and unbranched $C_{12}$-$C_{24}$-alkyl, more particularly branched and unbranched $C_{14}$-$C_{20}$-alkyl, and more preferably branched and unbranched $C_{16}$-$C_{18}$-alkyl, such as branched and unbranched $C_{16}$-alkyl and branched and unbranched $C_{18}$-alkyl.

4. The method according to any of the preceding embodiments, wherein the AKD dispersion additionally comprises at least one fatty alcohol alkoxylate, fatty amine alkoxylate, fatty acid alkoxylate or (meth)acrylate dispersion.

5. The method according to embodiment 4, wherein the AKD dispersion additionally comprises at least one fatty alcohol alkoxylate.

6. The method according to embodiment 4 or 5, wherein the fatty alcohol and the fatty acid comprise 8 to 18 carbon atoms.

7. The method according to any of embodiments 4 to 6, wherein the alkoxylate is a $C_2$-$C_4$ alkoxylate, in particular ethoxylate and/or propoxylate.

8. The method according to any of embodiments 4 to 7, wherein the alkoxylate comprises 5 to 30, in particular 10 to 20 alkoxy groups.

9. The method according to any of the preceding embodiments, wherein the emulsifier is a starch derivative.

10. The method according to any of the preceding embodiments, wherein the emulsifier has a nitrogen content in the range from 0.05 to 1% by weight, in particular 0.2 to 0.8% by weight.

11. The method according to any of the preceding embodiments, wherein the emulsifier has a Brookfield viscosity in a 10% w/w aqueous solution (RVDV-II+PX, spindle 01, 6 rpm, 20° C.) in the range from about 3 to about 200 mPas, in particular in the range from about 10 to about 200 mPas or about 10 to about 100 mPas.

12. The method according to any of the preceding embodiments, wherein the AKD dispersion is prepared by adding the alkyl ketene dimer in the form of an aqueous precursor dispersion to components (b) and (c).

13. The method according to any of the preceding embodiments, wherein the cement slurry comprises Portland cement.

14. The method according to any of the preceding embodiments, wherein the aqueous AKD dispersion comprises 1 to 60 wt %, preferably 5 to 50 wt %, more particularly 10 to 45 wt %, of ketene dimer, based on the total weight of the dispersion.

15. The method according to any of the preceding embodiments, wherein the aqueous AKD dispersion comprises 1 to 15 wt %, preferably 1 to 10 wt %, more particularly 2 to 8 wt %, of emulsifier, based on the overall solids content of the dispersion.

16. The method according to any of the preceding embodiments, wherein the aqueous AKD dispersion comprises aluminium sulfate, in particular 0.1 to 10 wt %, preferably 0.1 to 7.5 wt %, and in particular 0.2 to 5 wt % of aluminium sulfate, based on the ketene dimer.

17. The method according to any of the preceding embodiments, wherein the aqueous AKD dispersion has a charge density in the range from −10 to −120 µeq/g, in particular −20 to −100 µeq/g.

18. The method according to any of the preceding embodiments, wherein the weight ratio of ketene dimer to said condensation product is in the range from 200:1 to 5:1, in particular 100:1 to 10:1.

19. The method according to any of embodiments 4 to 18, wherein the aqueous AKD dispersion comprises 0.1 to 3 wt %, preferably 0.2 to 2 wt %, more preferably 0.2 to 1.5 wt % of said fatty alcohol alkoxylate, fatty amine alkoxylate or fatty acid alkoxylate, based on the overall solids content of the dispersion.

20. The method according to any of embodiments 4 to 19, wherein the weight ratio of ketene dimer to said fatty alcohol alkoxylate, fatty amine alkoxylate or fatty acid alkoxylate is in the range from 500:1 to 10:1, in particular 200:1 to 10:1.

21. The method according to any of the preceding embodiments, wherein the aqueous AKD dispersion comprises a wax, in particular a paraffin wax.

22. The method according to embodiment 25, wherein the aqueous AKD dispersion comprises 2 to 40 wt %, in particular 5 to 30 wt %, of the wax.

23. The method according to embodiments 21 or 22, wherein the weight ratio of ketene dimer to said wax is in the range from 50:1 to 1:50.

24. The method according to any of the preceding embodiments, wherein the aqueous AKD dispersion has a pH in the range from 3 to 9, preferably 4 to 9, in particular 4 to 8.

25. The method according to any of embodiments 14 to 23, wherein the disperse phase of the aqueous precursor ketene dimer dispersion has an average diameter of <10 µm, preferably <5 µm, more preferably <3 µm and in particular <2 µm, with the lower limit being 0.4 µm.

26. The method according to any of the preceding embodiments, wherein the aqueous AKD dispersion is essentially free of an organic solvent.

27. The method according to any of the preceding embodiments, wherein the ketene dimer is used in an amount of 0.02 to 8, preferably 0.1 to 5, more particularly 0.2 to 3 wt %, based on the mass of cement.

28. The method according to any of the preceding embodiments, wherein one or more additives are additionally added to the AKD dispersion which additives are selected from cellulose ethers, slaked lime, mineral additives, low-density aggregates, fibers, fiber-containing components, starch, modified starch, accelerators, thickeners, retarders, air entrainers, foaming agents, antifoam additives, swelling agents, fillers, polyacrylates, dispersants, plasticizers, superabsorbents, and stabilizers.

29. The method according to embodiment 28, wherein the one or more additives are selected from fibers and fiber-containing components.

30. The method according to any of the preceding embodiments, wherein the aqueous AKD dispersion comprises aluminium sulfate.

31. The method according to embodiment 30, wherein the aqueous AKD dispersion comprises 0.1 to 10 wt %, preferably 0.1 to 7.5 wt %, and in particular 0.2 to 5 wt % of aluminium sulfate, based on the ketene dimer.

32. The method according to any of the preceding embodiments, wherein the AKD dispersion is prepared by adding component (c) to component (b) in an amount such that the dispersion has a charge density in the range from −5 to −150 µeq/g and then adding the alkyl ketene dimer.

33. The use of an aqueous alkyl ketene dimer dispersion (AKD dispersion) as defined in any one of embodiments 1 to 12 or 14 to 32 for hydrophobizing concrete or mortar.

34. The use of embodiment 33, wherein the alkylketene dispersion is used for mass hydrophobization of concrete or mortar.

35. The use of embodiment 33, wherein the alkylketene dispersion is used for surface hydrophobization of concrete.

36. A prefabricated cement-containing building material, comprising a cement body hydrophobized with a dispersion as defined in any one of embodiments 1 to 32.

37. A prefabricated cement-containing building material obtainable by the method according to any one of embodiments 1 to 32.

38. The prefabricated building material according to embodiment 36 or 37, which is selected from panels, rods, and pipes.

39. The prefabricated building material according to any one of embodiments 36 to 38, which comprises fibers or a fiber-containing component.

40. The prefabricated building material according to embodiment 39, wherein the fiber-containing component is a paper, glass fibers, a woven or non-woven glass or a card.

41. The prefabricated building material according to embodiment 40, wherein the fiber-containing component is present on at least one of the surfaces of the prefabricated building material or incorporated parallel to at least one of the surfaces into the prefabricated building material.

42. The prefabricated building material according to any of embodiments 36 to 41, wherein the fiber-containing component comprises macroscopic fibers in netlike disposition or microscopic fibers in sheet-like distribution.

43. The prefabricated building material according to any of embodiments 36 to 42, wherein the fibers are cellulose fibers and the fiber-containing component comprises cellulose fibers.

Figure 1:
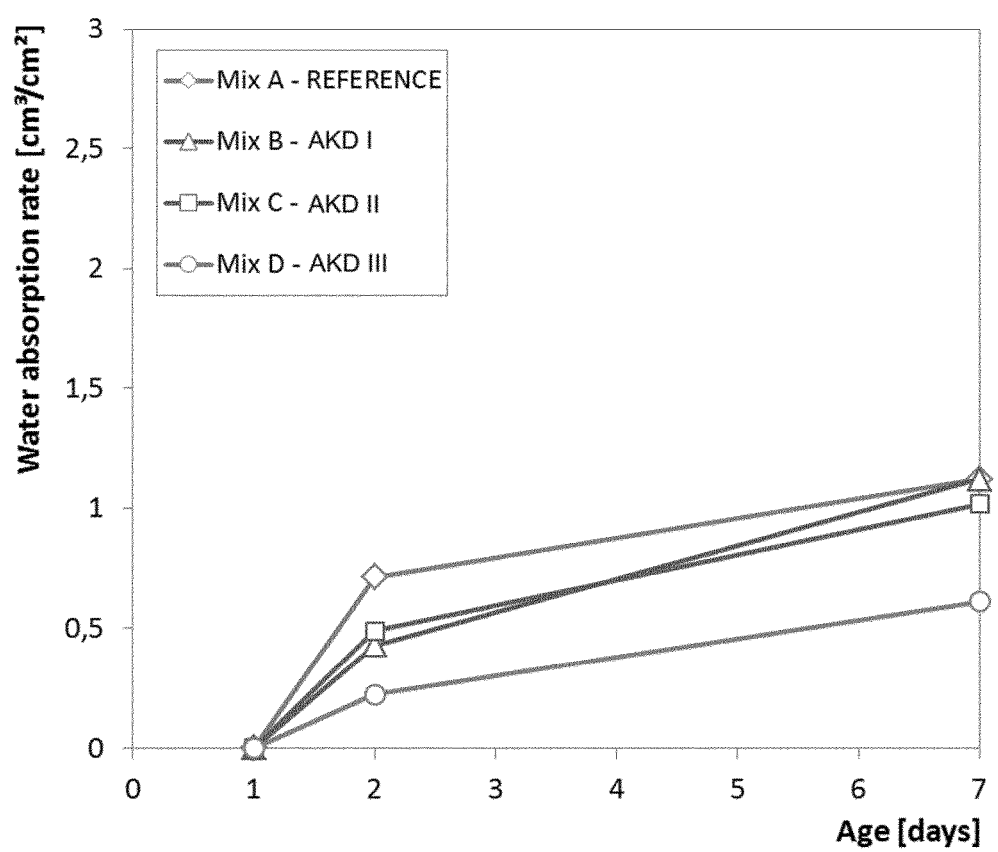
FIG. 1 shows the water absorption rate of concrete measured as of 1 day after casting.

According to a first embodiment, the process is suitable for mass (body) hydrophobization of concrete or mortar by adding the dispersion of an alkylketene dimer (hereinafter also called alkylketene dispersion or ketene dispersion) to the cement slurry and allowing the obtained slurry to harden. Preferably, the alkylketene dispersion and the cement slurry are thoroughly mixed to obtain a homogenous distribution of the alkylketene dispersion in the slurry. In this manner a homogenously hydrophobized concrete is obtained. The mixing of the alkylketene dispersion into the cement slurry is done in a conventional manner, for example by conventional mixing devices used in concrete preparation.

According to a second embodiment, the process is suitable for surface hydrophobization of concrete by allowing the cement slurry of step (A) first to harden to concrete and then applying the alkylketene dispersion to the surface of the hardened concrete. Preferably, the alkylketene dispersion is applied to the surface of dry concrete. The application of the alkylketene dispersion to the surface of dry concrete is done in a conventional manner, for example by spraying or brushing.

The cement slurry is prepared from a cement mixture that is suitable for concrete preparation by adding water in amount to achieve a water to cement ratio of <0.80, preferably in the range from about 0.30 to 0.70 or 0.60, more preferably 0.35 to 0.50. The water introduced by adding the alkylketene dispersion is to be taken into account. The cement mixture in general comprises cement, fine and coarse aggregates such as sand, gravel or crushed stone. Any cement, in particular Portland cement, or cementitious materials, such as fly ash or slag, can be used. Further, the mixture may comprise additives such as plasticizers, hardening accelerators, slump retainers, retarders, fillers, pigments, corrosion inhibitors, fibers, etc.

The ketene dimer is obtained by dimerization of ketenes. The ketenes are prepared, for example, by reaction of carbonyl chlorides with tertiary amines. Of particular technical importance are carbonyl chlorides which are obtainable by chlorination of naturally occurring fatty acids or mixtures thereof, examples being acid chlorides based on fatty acids got from coconut oil, tall oil, castor oil, olive oil, bovine tallow, or palm kernel oil. Typical examples of carbonyl chlorides are myristoyl chloride, palmitoyl chloride, stearoyl chloride, oleoyl chloride, behenoyl chloride, and isostearoyl chloride. The reaction of the carbonyl chlorides with the tertiary amines is conducted with particular advantage in the absence of solvents, with thorough mixing, at temperatures of 65 to 150° C. in accordance with the method known from EP-A 1 453 821.

The hydrocarbon radicals in formula I or II are selected preferably from branched and unbranched $C_{12}$-$C_{24}$-alkyl or $C_{12}$-$C_{24}$-alkenyl; more preferably from branched and unbranched $C_{12}$-$C_{24}$-alkyl; and very preferably from branched and unbranched $C_{14}$-$C_{20}$-alkyl. With very particular preference the hydrocarbon radicals are selected from branched and unbranched $C_{14}$-, $C_{15}$-, $C_{16}$-, and $C_{18}$-alkyl.

"Alkenyl" as used herein means branched and unbranched, ethylenically unsaturated aliphatic hydrocarbons having one, two, or three double bonds.

It has been found that the use of an AKD emulsion with an emulsifier having a nitrogen content of ≤1% by weight imparts improved hydrophobicity to the concrete. In particular, the emulsifier is selected from the group consisting of a starch, cellulose, starch derivative or cellulose derivative.

Emulsifiers having a nitrogen content in the range from 0.05 to 1% by weight as determined by elemental analysis are low to highly cationically modified emulsifiers. Suitable emulsifiers are low to highly cationically modified starches and celluloses and derivatives thereof with starches and derivatives thereof being preferred. Low cationically modified emulsifiers have a nitrogen content from 0.05 to 0.18% by weight whereas high cationically modified emulsifiers have a nitrogen content from 0.2 to 1% by weight. Preferred starches and celluloses are those modified by ammonium structural units. Cationic starch and cationic cellulose contemplated comprises all water-soluble starches and water-soluble celluloses that have an amino group and/or ammonium group as cationic group. Such starches are available commercially. They are obtained, for example, by reaction of native starch with compounds which have tertiary or quaternary nitrogen atoms, such as alkylaminoalkyl epoxides or alkylaminoalkyl chlorides. Examples of such compounds are 3-chloro-2-hydroxypropyltrimethylammonium chloride and glycidyltrimethylammonium chloride.

Preferred low cationic starches have ammonium structural units which are identical or different and conform to the formula (IIIa) and/or the formula (IIIb)

in which
A is branched or unbranched $C_1$-$C_4$-alkylene which is optionally substituted by one or more hydroxyl or phenyl groups; or
A is $C_1$-$C_3$-alkylene-phenylene, phenylene-$C_1$-$C_3$-alkylene, or $C_1$-$C_3$-alkylene-phenylene-$C_1$-$C_3$-alkylene which is optionally substituted by one or more hydroxyl groups; and $R^3$, $R^4$, and $R^5$ independently of one another are branched or unbranched $C_1$-$C_4$-alkyl or $C_2$-$C_4$-hydroxyalkyl, it also being possible for $R^5$ to be H.

Preference is given to the ammonium structural units which are identical or different and conform to the formula (IIIb) in which A is —$CH_2$—CHOH—$CH_2$—, —$CH_2$—CH($CH_2$OH)—, or —$CH_2$—$CH_2$—; and $R^3$, $R^4$, and $R^5$ independently of one another are methyl or ethyl.

In one preferred embodiment the ammonium structural units conform to the formula (IV).

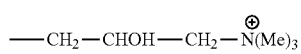

(IV)

A low cationic starch or low cationic cellulose may also be a low cationic degraded starch or cellulose. Degraded starches and celluloses are obtainable by subjecting a native starch or cellulose first to a degradation procedure in order to reduce the molecular weight of the starch or cellulose to give a Brookfield viscosity (20° C.; spindle 61 or 62; 12 rpm) in the range from about 10 to about 500 mPas in a 10% w/w aqueous solution, and then cationizing the degraded starch or cellulose. The degradation may take place oxidatively, thermally, hydrolytically and/or enzymatically. An example for a low cationic starch of the invention is Amylex KLP commercially available from Südstärke GmbH. (nitrogen content of about ≤0.1% by weight).

Further examples of cationic emulsifiers are highly cationic starches and highly cationic celluloses (highly cationic means a nitrogen content of more than 0.4 wt %). Preferred polysaccharides are those modified by ammonium structural units.

A highly cationic starch or highly cationic cellulose may also be a highly cationized degraded starch or cellulose. The latter are obtainable by subjecting a native starch or cellulose first to a degradation procedure in order to reduce the molecular weight of the starch or cellulose, and then cationizing the degraded starch or cellulose. The degradation may take place oxidatively, thermally, hydrolytically and/or enzymatically.

The degree of substitution of the highly cationic cationic starch is preferably 0.1 to 0.5 and more preferably in the range from 0.2 to 0.4.

A suitable basis for cationic starches comprises, for example, starches from potatoes, tapioca, rice, wheat, corn, sorghum, and peas. The amylopectin content of starches may amount for example to 0.1% to 100%. One example of a highly cationic cationic starch is Percole® 134 EP, with a degree of substitution of 0.17. Particularly preferred is cationic potato starch which is modified with a tertiary amine or with a quaternary amine and has a viscosity of 50 to 200 mPas (measured in a Brookfield viscometer at a temperature of 20° C., spindle 2, with a solids content of 3.0%). An example for a high cationic starch of the invention is Hi-Cat from Roquette (nitrogen content of about 0.3% by weight.

According to an embodiment, the emulsifier has a Brookfield viscosity in a 10% w/w aqueous solution (RVDV-II+ PX, spindle 01, 6 rpm, 20° C.) in the range from about 3 to about 200 mPas, in particular in the range from about 10 to about 200 mPas or about 10 to about 100 mPas.

The ketene dimer dispersion may be additionally stabilized by a dispersant, preferably by a protective colloid. The protective colloid may be nonionic, or amphoteric, and is selected more particularly from synthetic, natural, and modified natural polymers.

Examples of suitable nonionic protective colloids are polyvinyl alcohol, polyvinylpyrrolidone and copolymers containing vinylpyrrolidon, hydroxypropylcellulose, or hydroxypropylmethylcellulose, etc. A list of suitable protective colloids is published in Houben-Weyl, Methoden der organischen Chemie, Band XIV/1, Makromolekulare Stoffe, Georg-Thieme-Verlag, Stuttgart, 1961, S. 411 bis 420.

Examples of suitable amphoteric protective colloids are proteins, such as gelatine.

Employed with particular preference are the aforementioned nonionic colloids. According to the invention it has surprisingly been found that the use of an AKD dispersion containing a condensation product of phenol sulfonic acid or naphthalene sulfonic acid and formaldehyde or a condensation product of phenolsulfonic acid, phenol, formaldehyde and urea results in improved hydrophobicity of the concrete. Such condensation products are commercially available from BASF SE. Examples are Tamol® DN or Tamol® NN7718.

Furthermore, it has surprisingly been found that the ketene dimer can be partially replaced by a wax, in particular a paraffin wax, without impairing hydrophobicity and setting properties of the gypsum composition.

The aqueous ketene dispersion preferably comprises 1 to 60 wt %, more particularly 5 to 50 wt %, and more preferably 10 to 45 wt %, of ketene dimer. The aqueous ketene dispersion preferably further comprises 0.1 to 10 wt %, more preferably 0.1 to 7.5 wt % and in particular 0.2 to 5 wt % of aluminium sulfate, based on the ketene dimer.

In the AKD dispersion component (c) is used in an amount such that the dispersion has a charge density in the range from −5 to −150 μeq/g, preferably in the range from −10 to −120 μeq/g, in particular −20 to −100 μeq/g. Thus, the condensation product (c) is in general present in an amount of 0.1 to 5 wt %, preferably 0.5 to 4 wt % and in particular 1 to 3 wt %, based on said condensation product.

The charge density of the dispersion is determined with a coulometer (Mütek PCD 04) at pH 3.5 with a 0.001 mol/L Poly-DADMAC-solution (polydiallyldimethyl ammoniumchloride, commercially available, for example from Sigma-Aldrich) for anionic surfaces and 0.001 mol/L Sodium polyethylene sulfonate for cationically charged particle surfaces. From each sample an amount of 1-2 grams is taken and diluted with Soerensen buffer solution (mixture of citrate buffer and 0.1 mol/L HCl, Ref.: "Chemische Tabellen and Rechentafeln für die analytische Praxis", Rauscher/Voigt/Wilke/Wilke, p. 141) to a volume of 100 mL. A sample of 10 mL solution is used for the measurement. As a result, the charge density is obtained as μeq/g dispersion.

The aqueous AKD ketene dispersion preferably has a pH of 3 to 9, preferably 4 to 8.

The aqueous AKD dispersions which comprise aluminium sulfate preferably also comprise at least one acid selected from saturated $C_1$-$C_{10}$ carboxylic acids, benzenesulfonic acid, p-toluenesulfonic acid, and mineral acids ($H_2SO_4$, $H_3PO_4$). The acid is preferably present in an amount of 0.5 to 5 wt %, based on the ketene dimer.

The ketene dimer dispersions optionally comprise, based in each case on the ketene dimer, (a) 0.1 to 10 wt % of aluminium sulfate, and/or (b) 1 to 15 wt % of component (b), and/or (c) 0.1 to 5 wt % of component (c), and/or (d) 0.5 to 5 wt % of at least one saturated carboxylic acid having 1 to 10 C atoms, benzenesulfonic acid, p-toluenesulfonic acid and/or a mineral acid ($H_2SO_4$, $H_3PO_4$).

The disperse phase of the AKD dispersions generally has an average diameter of less than 10 µm, more particularly less than 5 µm, preferably less than 2 µm, more preferably less than 1 µm, very preferably less than 0.5 µm. In accordance with one of the following embodiments, the disperse phase of the ketene dispersions has an average diameter in the range from 0.5 to 10 µm, 0.5 to 5 µm, 1 to 10 µm, or 1 to 5 µm. The ketene dimer dispersion sizes reported here are weight-average sizes of the kind ascertainable by dynamic light scattering. Methods for doing this are familiar to the skilled person from—for example—H. Wiese in D. Distler, Wässrige Polymerdispersionen, Wiley-VCH 1999, section 4.2.1, p. 40ff and literature cited therein, and also H. Auweter, D. Horn, J. Colloid Interf. Sci. 105 (1985) 399, D. Lilge, D. Horn, Colloid Polym. Sci. 269 (1991) 704, or H. Wiese, D. Horn, J. Chem. Phys. 94 (1991) 6429.

The ketene dimers used have a melting point of approximately 45-70° C. Depending on temperature, therefore, the disperse phase may be present at least partly in liquid form. It is advantageous if the ketene dimers, following incorporation into the gypsum hemihydrate or anhydrite, as for example during the drying thereof, are exposed briefly (1 to 60 minutes) to a temperature above the melting point of the ketene dimer, and cool down again. In general the heat treatment takes place at a temperature in the range from 40 to 110° C., more particularly 50 to 100° C., and preferably 60 to 90° C.

It is preferred to use 0.02 to 8, preferably 0.1 to 5, more particularly 0.2 to 3 wt %, very preferably 0.5 to 2.5 wt %, of the ketene dimer, based on the mass of the cement mixture.

In the production of the concrete, fibers or a fiber-containing component may be included in the processing procedure. The fibers in question may be plant fibers, such as cellulose fibers, glass fibers, plastics fibers, mineral fibers, or metal fibers. Hydrophobized fibers or fiber-containing components may be used.

The AKD dispersion may be added during preparation of the cement slurry in any order with the other components, i.e. simultaneously or one after the other, each partly or completely and/or after the preparation of the cement slurry.

The present invention also relates to a hydrophobized concrete obtainable by the process of the invention.

"Hydrophobized" as used herein means that the water absorption rate [$cm^3/cm^2$] as measured according to the "Karsten Röhrchen" (water penetration test according to Karsten as described in Handbuch Bauchemie (ISBN 3-7880-7438-8); suitable devices are commercially available from Ludwig Mohren K G, Aachen) is less than 6 $cm^3/cm^2$ (test sample 1 day old, water penetration measured after 7 days) or less than 6 $cm^3/cm^2$ (test sample 35 days old, water penetration measured after 42 days).

The following examples illustrate the invention without limiting it. All percentages are given as wt %.

EXAMPLE 1

Four concrete mixes were produced: one reference mix and three mixes modified with AKD emulsion. The solid content of AKD (alkylketene dimer) emulsion was added on top (compared to reference mix). In doing so the active content of 0.5% AKD in the mix was kept constant. Concrete slabs with 40 mm in thickness were cast, demoulded after 24 hours and stored at 23° C./50% RH. The water absorption rate was determined by "Karsten Röhrchen", Ludwig Mohren K G, Aachen. Starting at different test ages, i.e. after 1 day, 7 days and 35 days after casting. The aim was to proof the mass hydrophobization effect of the AKD dispersion in concrete. Mass hydrophobization is indicated by reduction in water absorption rate.

TABLE 1

| Basic component | Mix proportion [kg/m³] | | | |
|---|---|---|---|---|
| | Mix A Reference | Mix B AKD I | Mix C AKD II | Mix D AKD III |
| Cement - Schwenk Karlstadt CEM I 42.5R | 330 | 330 | 330 | 330 |
| Filler - Calcit MS 12 | 130 | 130 | 130 | 130 |
| Quartz sand 0/0.5 mm | 49 | 49 | 49 | 49 |
| Quartz sand 0/1.0 mm | 33 | 33 | 33 | 33 |
| Quartz sand 0/4 mm | 1110 | 1110 | 1110 | 1110 |
| Gravel 4/8 mm | 326 | 326 | 326 | 326 |
| Water | 200 | 200 | 200 | 200 |
| SUM | 2178 | 2178 | 2178 | 2178 |
| On top addition[1] | | | | |
| AKD emulsion I | 0 | 35 | 0 | 0 |
| AKD emulsion II | 0 | 0 | 33 | 0 |
| AKD emulsion III | 0 | 0 | 0 | 34 |
| Extra water | 35 | 12 | 14 | 13 |

[1] In case of mixes B, C and D the solid content of the AKD emulsion was added on top compared to mix A (reference). The solid content of AKD emulsion was 35% by weight. The difference in dosage of AKD emulsion is due to difference in active content.

AKD I: Aqueous dispersion of a C16/C18 (50:50) alkylketene dimer (in formula I and II: $R^1$ and $R^2$ are $C_{14}$ and $C_{16}$ alkyl, respectively) dispersed with 3 wt % of a nonionic, low-viscosity starch (Amylex 15 of Südstärke GmbH; nitrogen content <0.10% by weight; Brookfield viscosity 16.5 mPas) and 1 wt % of the sodium salt of the condensation product of naphthalenesulfonic acid and formaldehyde (Tamol NN 7718; commercially available from BASF SE). The average particle diameter is about 2000 nm. The total solids content is about 35%; AKD about 31%.

AKD II: Aqueous dispersion of a C16/C18 (50:50) alkylketene dimer (in formula I and II: $R^1$ and $R^2$ are $C_{14}$ and $C_{16}$ alkyl, respectively) dispersed with 1.5 wt % of a low cationic degraded starch and 1 wt % of the sodium salt of the condensation product of naphthalenesulfonic acid and formaldehyde (Tamol NN 7718; commercially available from BASF SE). The average particle diameter is about 2000 nm. The total solids content is about 35%; AKD about 33%.

AKD III: Aqueous dispersion of a C16/C18 (50:50) alkylketene dimer (in formula I and II: $R^1$ and $R^2$ are $C_{14}$ and $C_{16}$ alkyl, respectively) dispersed with 2.6 wt % of polyvinylpyrrolidone and 1 wt % of the sodium salt of the condensation product of naphthalenesulfonic acid and formaldehyde (Tamol NN 7718; commercially available from BASF SE). The average particle diameter is about 2000 nm. The total solids content is about 35%; AKD about 31.4%.

TABLE 2

| Water absorption rate [$cm^3/cm^2$] determined by "Karsten Röhrchen" | | | | | |
|---|---|---|---|---|---|
| Age of specimen | Test duration | Mix A Reference | Mix B AKD I | Mix C AKD II | Mix D AKD III |
| 1 day | 0 | 0.0 | 0.0 | 0.0 | 0.0 |
| 2 days | 1 day | 3.5 | 2.1 | 2.4 | 1.1 |
| 7 days | 6 days | 5.5 | 5.5 | 5.0 | 3.0 |
| 7 days | 0 | 0.0 | 0.0 | 0.0 | 0.0 |

TABLE 2-continued

Water absorption rate [cm³/cm²] determined by "Karsten Röhrchen"

| Age of specimen | Test duration | Mix A Reference | Mix B AKD I | Mix C AKD II | Mix D AKD III |
|---|---|---|---|---|---|
| 8 days | 1 day | 3.0 | 0.6 | 0.4 | 0.5 |
| 14 days | 7 days | 5.0 | 1.3 | 0.7 | 0.9 |
| 35 days | 0 | 0.0 | 0.0 | 0.0 | 0.0 |
| 36 days | 1 day | 15 | 1.8 | 1.4 | 1.5 |
| 42 days | 7 days | — | 5.0 | 2.1 | 2.1 |

Figure 2:
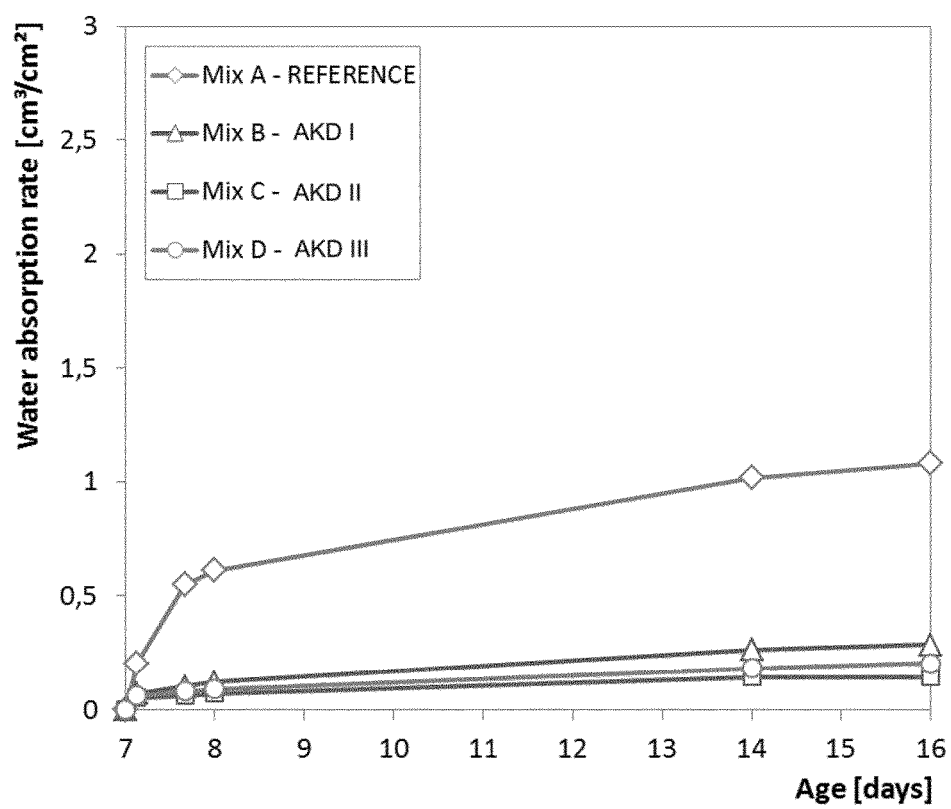
FIG. 2 shows the water absorption rate of concrete measured as of 7 day after casting.
Figure 3:
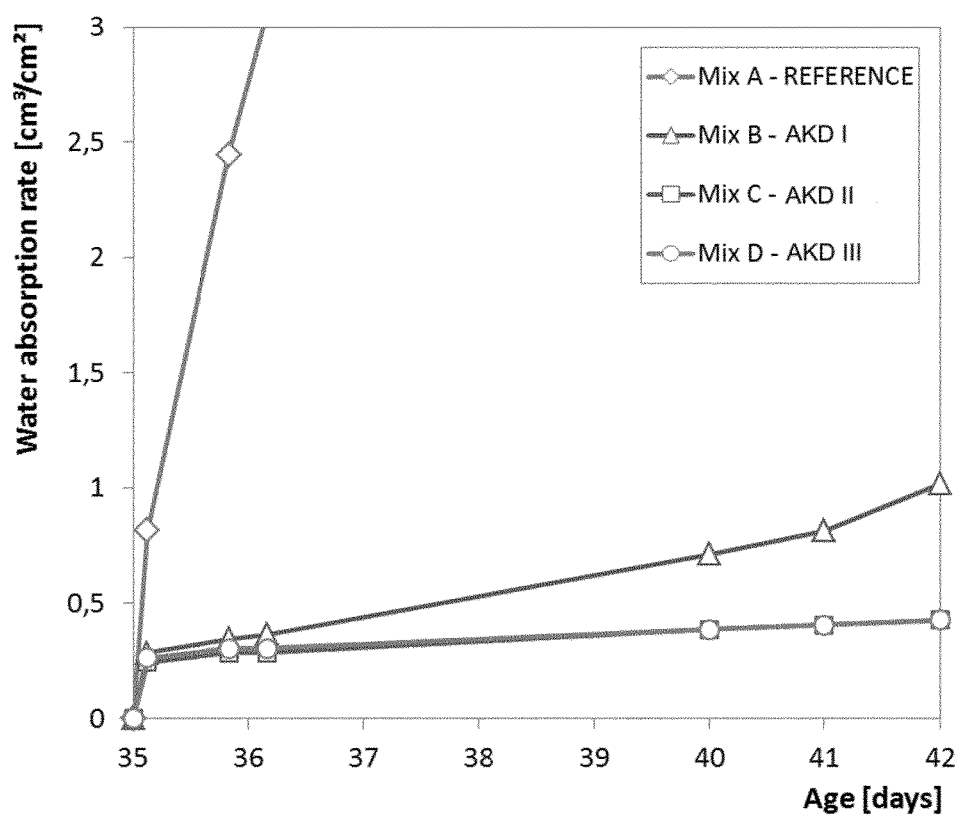
FIG. 3 shows the water absorption rate of concrete measured as of 35 day after casting.

The results show that on top addition of ~1.5% AKD dispersion by total mass results in mass hydrophobization of the concrete mix, i.e. the water absorption rate is significantly reduced. Further, the effect of mass hydrophobization is more pronounced with increasing test age as demonstrated in FIGS. 1 to 3.

EXAMPLE 2

Two different types of AKD dispersions (AKD I and III as defined above) were tested for surface hydrophobization on concrete material. The AKDs were diluted with water 1:4 and 1:99. The mix was coated with a brush on a dry concrete plate (Antoniazzi plate). After drying (24 h) a water drop was placed on the coated surface and the repellent behaviour was observed.

TABLE 3

Mix proportion and storage stability

| Basic component | Mix B AKD I[1)] | Mix D AKD III[1)] |
|---|---|---|
| Storage stability | Stable | stable |

TABLE 4

Hydrophobization behavior

| Basic component | Mix B AKD I | Mix D AKD III |
|---|---|---|
| Hydrophobisation behaviour | Excellent | Good |
| Whitening of surface | High | low |

As can be seen, effective surface hydrophobization could be achieved. Undesired whitening could be avoided by diluting the AKD dispersion.

EXAMPLE 3

1. The following additional AKD dispersions were provided:

AKD Dispersion IV (Comparative):

Aqueous dispersion of a C16/C18 (50:50) alkylketene dimer dispersed with 3 wt % of a highly cationic modified, low-viscose starch (in formula I and II: R1 and R2 are C14 and C16 alkyl, respectively, (Basoplast 88 commercially available from BASF) and 1 wt % of sodium salt of naphthalenesulphonic acid condensation product (Tamol NN 7718; commercially available from BASF SE). The average particle diameter is about 1000 nm. The charge density of the dispersion is about +77 µeq/g. The total solids content is about 24%.

AKD Dispersion V (According to the Invention):

Aqueous dispersion of a C16/C18 (50:50) alkylketene dimer (in formula I and II: R1 and R2 are C14 and C16 alkyl, respectively) dispersed with 2 wt % of a highly cationically modified, low viscosity starch) and 2 wt % of the sodium salt of the condensation product of naphthalenesulfonic acid with formaldehyde (Tamol NN 7718). The average particle diameter is about 1000 nm. The viscosity is about 10 mPas (Method: Brookfield, RVDV-II+PX, spindle 01, 6 rpm, 20° C.). The charge density of the dispersion is about −80 µeq/g. The total solids content is about 20%. 16 wt % of AKD, 2 wt of starch, 2 wt % of condensation product and 80 wt % water.

2. The AKD dispersions were mixed with a cement slurry in proportions to prepare test samples as indicated in the following table 1:

TABLE 1

| Components | Mix A reference | Mix B AKD IV | Mix C AKD V |
|---|---|---|---|
| Cement - Schwenk Karlstadt CEM I 42.5R | 330 | 330 | 330 |
| Filler - Calcit MS 12 | 130 | 130 | 130 |
| Quartz sand 0/0.5 mm | 49 | 49 | 49 |
| Quartz sand 0/1.0 mm | 33 | 33 | 33 |
| Quartz sand 0/4 mm | 1110 | 1110 | 1110 |
| Gravel 4/8 mm | 326 | 326 | 326 |
| Water | 160 | 160 | 160 |
| Total | 2138 | 2138 | 2138 |
| On top addition | | | |
| AKD emulsion VI | | 65 | |
| AKD emulsion V | | | 85 |
| Extra water | 75 | 25.6 | 7 |

3. Water absorption rate was determined by "Karsten Röhrchen" and is given in the following table 2 in [cm³/cm²].

TABLE 2

| Age of specimen | Test duration | Mix A Reference | Mix B AKD IV (Ref) | Mix C AKD V (invention) |
|---|---|---|---|---|
| 35 days | 0 | 0 | 0 | 0 |
| 35.25 days | 0.25 day | 7.3 | 0.1 | 0.1 |
| 36 days | 1 day | 23.3 | 0.25 | 0.25 |
| 37 days | 2 days | 39 | 0.4 | 0.35 |
| 38 days | 3 days | 55 | 0.9 | 0.5 |
| 39 days | 4 days | 63 | 1.0 | 0.7 |
| 42 days | 7 days | 74 | 1.3 | 0.8 |

The results show that with both, AKD IV and AKD V dispersion, the water absorption rate is significantly reduced. AKD V dispersion (according to invention), however, imparts improved hydrophobization as compared to reference AKD I dispersion.

4. Three concrete mixes were produced for flow measurements: one reference mix and two mixes modified with AKD emulsions. The solid content of the AKD emulsion was added on top (compared to reference mix). After mixing the concrete slurries were poured in a graded Vicat-ring which was placed on a glass plate. Two minutes after start of mixing the Vicat-ring was lifted and the diameter of the slurry was determined. The same flow test was done after 15 and 30 minutes after start of mixing.

Mix proportions [g] are given in the following table 3:

TABLE 3

| Component | Mix A Reference | Mix B AKD IV (Ref) | Mix C AKD V (invention) |
|---|---|---|---|
| Cement - Milke CEM I 52.5 R | 380 | 380 | 380 |
| Quartz sand 0.09/0.4 mm | 135 | 135 | 135 |
| Quartz sand 0.25/0.63 mm | 112 | 112 | 112 |
| Quartz sand 0.63/1.2 mm | 313 | 313 | 313 |
| Fly Ash Powerment WIII | 30 | 30 | 30 |
| Filler - Omyacarb 15AL | 30 | 30 | 30 |
| Water | 200 | 200 | 200 |
| SUM | 1200 | 1200 | 1200 |

| On top addition | Mix A Reference | Mix B AKD I (Ref) | Mix C AKD II (invention) |
|---|---|---|---|
| AKD emulsion IV | | 19 | |
| AKD emulsion V | | | 23.75 |
| Extra water | 25 | 10.5 | 6 |

The results of the flow behavior are given in the following table 4:

TABLE 4

| | Mix A Reference | Mix B AKD IV (Ref) | Mix C AKD V (invention) |
|---|---|---|---|
| Flow (after mixing) | 17.6 cm | 11.2 cm | 13.2 cm |
| Flow (after 15 min) | 15.7 cm | 11.8 cm | 13.1 cm |
| Flow (after 30 min) | 14.5 cm | 11.7 cm | 12.7 cm |

It can be seen that both AKD dispersions lead to thickening in comparison to the reference mix A. However, AKD V dispersion (according to invention) showed lower thickening as compared to reference AKD IV dispersion. Thus, the workability of the AKD dispersion is improved.

The invention claimed is:

1. A process for preparing hydrophobized concrete or mortar comprising the steps of
   (A) providing a cement slurry suitable for concrete or mortar preparation;
   (B1) adding an alkylketene dimer in at least one of solid form or aqueous dispersion, the alkylketene dimer comprising
   (a) an alkylketene dimer of the formula (I)

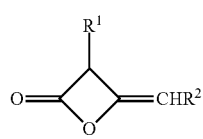

(I)

and/or of the formula (II)

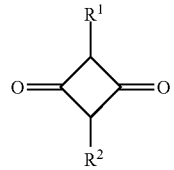

(II)

in which
R$^1$ and R$^2$ are identical or different hydrocarbon radicals comprising 10 to 24 carbon atoms;
(b) at least one emulsifier having a nitrogen content of ≤1% by weight selected from the group consisting of a starch, cellulose, starch derivative or cellulose derivative;
(c) a condensation product of phenol sulfonic acid and formaldehyde, naphthalene sulfonic acid and formaldehyde or naphthalene sulfonic acid, phenol, formaldehyde and urea wherein the sulfonic acid groups may optionally be present in protonated or deprotonated or partly in protonated and partly in deprotonated form;
wherein the dispersion has a charge density in the range from −5 to −150 μeq/g;
and allowing the cement slurry to harden
or
(B2) allowing the cement slurry of step (A) to harden and applying said alkylketene dimer in aqueous dispersion to the surface of the hardened cement.

2. The process of claim 1, wherein said emulsifier is selected from modified starch and modified cellulose.

3. The process of claim 1 wherein the dispersion has a charge density in the range from −10 to −120 μeq/g.

4. The process of claim 1, wherein the at least one emulsifier has a nitrogen content in the range from 0.05 to 1% by weight.

5. The process of claim 1, wherein the hydrocarbon radicals in formula I or II are selected from branched and unbranched C$_{12}$-C$_{24}$-alkyl or C$_{12}$-C$_{24}$-alkenyl.

6. The process of claim 1, wherein the alkylketene dimer dispersion comprises 5 to 40 wt % of alkylketene dimer of the total weight of the dispersion.

7. The process of claim 1, wherein the emulsifier has a Brookfield viscosity in a 10% w/w aqueous solution, when using parameters RVDV-II+PX, spindle 01, 6 rpm, 20° C., in the range from about 3 to about 200 mPas.

8. The process of claim 1, wherein the cement slurry is provided by adding water to a cement mixture suitable for concrete preparation.

9. The process of claim 8, wherein in the case B1 the alkylketene dimer is used in an amount of 0.1 to 10 wt % of the total weight of the cement mixture.

10. The process of claim 7, wherein the cement slurry is essentially free of a synthetic resin other than the condensation product (c).

11. The process of claim 1, wherein the alkylketene dimer dispersion additionally comprises a wax or a (meth)acrylate dispersion.

12. A hydrophobized concrete or mortar obtained according to the process of claim 1.

13. A process comprising hydrophobizing concrete or mortar, by addition or application thereto, utilizing an aqueous alkyl ketene dimer dispersion comprising (a) an alkylketene dimer of the formula (I)

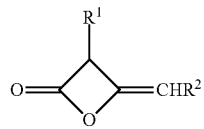
(I)

and/or of the formula (II)

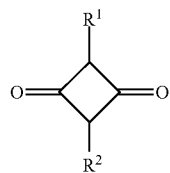
(II)

in which
R¹ and R² are identical or different hydrocarbon radicals comprising 10 to 24 carbon atoms;
(b) at least one emulsifier having a nitrogen content of ≤1% by weight selected from the group consisting of a starch, cellulose, starch derivative or cellulose derivative;
(c) a condensation product of phenol sulfonic acid and formaldehyde, naphthalene sulfonic acid and formaldehyde or naphthalene sulfonic acid, phenol, formaldehyde and urea wherein the sulfonic acid groups may optionally be present in protonated or deprotonated or partly in protonated and partly in deprotonated form;
wherein the dispersion has a charge density in the range from −5 to −150 µeq/g.

14. The process of claim 13, wherein the alkylketene dimer dispersion is utilized for mass hydrophobization of concrete or mortar by addition to a cement slurry suitable for concrete or mortar preparation.

15. The process of claim 13, wherein the alkylketene dimer dispersion is utilized for surface hydrophobization of concrete by applying the alkylketene dimer dispersion to the surface of the concrete.

* * * * *